US010661354B2

(12) United States Patent
Grindlund et al.

(10) Patent No.: US 10,661,354 B2
(45) Date of Patent: May 26, 2020

(54) HOLDER FOR A ROTARY TOOL, FOR EXAMPLE ONE HOLE SAW

(71) Applicant: Kapman AB, Enköping (SE)

(72) Inventors: Erik Grindlund, Enköping (SE); Per Holm, Lidköping (SE); Tomas Ivner, Källby (SE); Nils Classon, Lidköping (SE)

(73) Assignee: KAPMAN AB, Enköping (SE)

( * ) Notice: Subject to any disclaimer, the term of this patent is extended or adjusted under 35 U.S.C. 154(b) by 0 days.

(21) Appl. No.: 16/096,149

(22) PCT Filed: Apr. 21, 2017

(86) PCT No.: PCT/SE2017/050389
§ 371 (c)(1),
(2) Date: Oct. 24, 2018

(87) PCT Pub. No.: WO2017/188878
PCT Pub. Date: Nov. 2, 2017

(65) Prior Publication Data
US 2019/0134716 A1    May 9, 2019

(30) Foreign Application Priority Data

Apr. 29, 2016   (SE) ...................................... 1650573

(51) Int. Cl.
*B23B 31/107*   (2006.01)
*B23B 51/04*   (2006.01)
(Continued)

(52) U.S. Cl.
CPC ...... *B23B 31/1071* (2013.01); *B23B 51/0473* (2013.01); *B23B 31/028* (2013.01);
(Continued)

(58) Field of Classification Search
CPC . B23B 51/04; B23B 51/0473; B23B 51/0426; B23B 51/05; B23B 31/028;
(Continued)

(56) References Cited

U.S. PATENT DOCUMENTS

| 700,412 | A | * | 5/1902 | Fischer | ............... B23B 31/1071 |
| | | | | | 279/75 |
| 2,459,649 | A | * | 1/1949 | Jahrl | ................... B23B 31/1071 |
| | | | | | 279/75 |

(Continued)

FOREIGN PATENT DOCUMENTS

| CA | 2489805 A1 | 4/2001 |
| DE | 202013006690 U1 | 9/2013 |

(Continued)

OTHER PUBLICATIONS

International Search Report (PCT/ISA/210) dated Jun. 30, 2017, by the Swedish Patent Office as the International Searching Authority for International Application No. PCT/SE2017/050389.

*Primary Examiner* — Alan Snyder
*Assistant Examiner* — Yasir A Diab
(74) *Attorney, Agent, or Firm* — Buchanan Ingersoll & Rooney PC

(57) ABSTRACT

Holder for a rotary tool which holder is formed with a holder body comprising a rear drive end and a front connection end having a connection thread for the connection of the tool. The holder comprises a thrust collar having a flat contact surface facing a connection end of the holder. The holder comprises an axially movable operating means, a number of restraint elements placed in one or more spaces in the holder body which restraint elements in a first axial position of the operating means are prevented from radial movement in said spaces and which restraint elements in a second axial position of the operating means allow radial movement in said spaces. Each one of said spaces for the restraint (Continued)

elements is limited in the axial direction by a front limiting wall and a rear limiting wall, which two limiting walls are parts of the holder body.

19 Claims, 3 Drawing Sheets

(51) Int. Cl.
- *B27B 5/30* (2006.01)
- *B23B 51/05* (2006.01)
- *B23B 31/02* (2006.01)
- *B23B 31/11* (2006.01)

(52) U.S. Cl.
CPC ............... *B23B 31/11* (2013.01); *B23B 51/05* (2013.01); *B27B 5/30* (2013.01); *Y10T 408/9098* (2015.01); *Y10T 408/95* (2015.01)

(58) Field of Classification Search
CPC ....... B23B 31/06; B23B 31/10; B23B 31/107; B23B 31/1071; B23B 31/1073; B23B 31/1074; B23B 31/11; B23B 31/117; B23B 31/16; Y10T 408/95; Y10T 408/895; Y10T 408/8957; Y10T 408/9098; Y10T 279/17752; Y10T 279/17761; Y10T 279/3481; B27B 5/30
See application file for complete search history.

(56) References Cited

U.S. PATENT DOCUMENTS

| 2,481,945 | A | | 9/1949 | Panyard |
| 3,583,715 | A | * | 6/1971 | Jahrl .................... B23B 31/1071 279/75 |
| 6,250,856 | B1 | * | 6/2001 | Miyanaga ........... B23B 31/1071 279/75 |
| 7,104,738 | B2 | | 9/2006 | Cantlon |
| 7,112,016 | B2 | * | 9/2006 | Nordlin ............... B23B 31/1071 408/204 |
| 8,608,413 | B2 | | 12/2013 | Miyanaga |
| 8,721,236 | B2 | | 5/2014 | Kazda et al. |
| 10,150,169 | B2 | * | 12/2018 | Boske ................. B23B 51/0473 |
| 2005/0025592 | A1 | | 2/2005 | Cantlon |
| 2007/0160435 | A1 | * | 7/2007 | Chao .................... B23B 31/1071 408/102 |
| 2010/0127465 | A1 | | 5/2010 | Miyanaga |
| 2014/0255117 | A1 | | 9/2014 | Tseng |

FOREIGN PATENT DOCUMENTS

| EP | 2080574 A1 | 7/2009 |
| WO | 2005000506 A2 | 1/2005 |

* cited by examiner

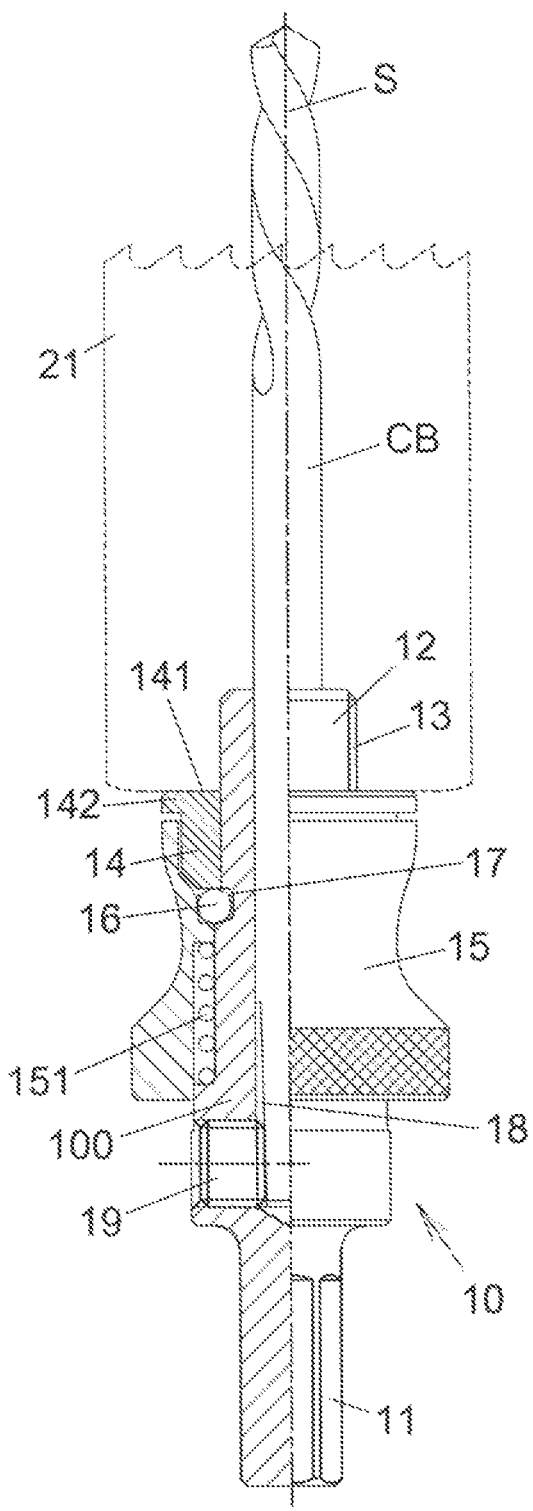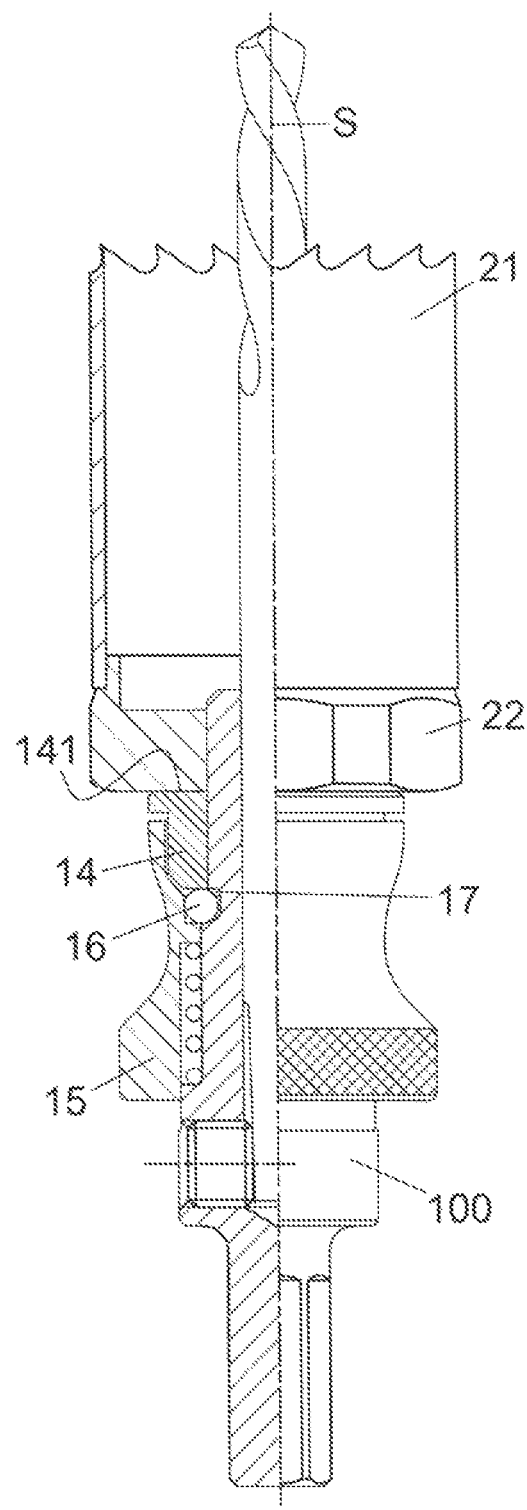

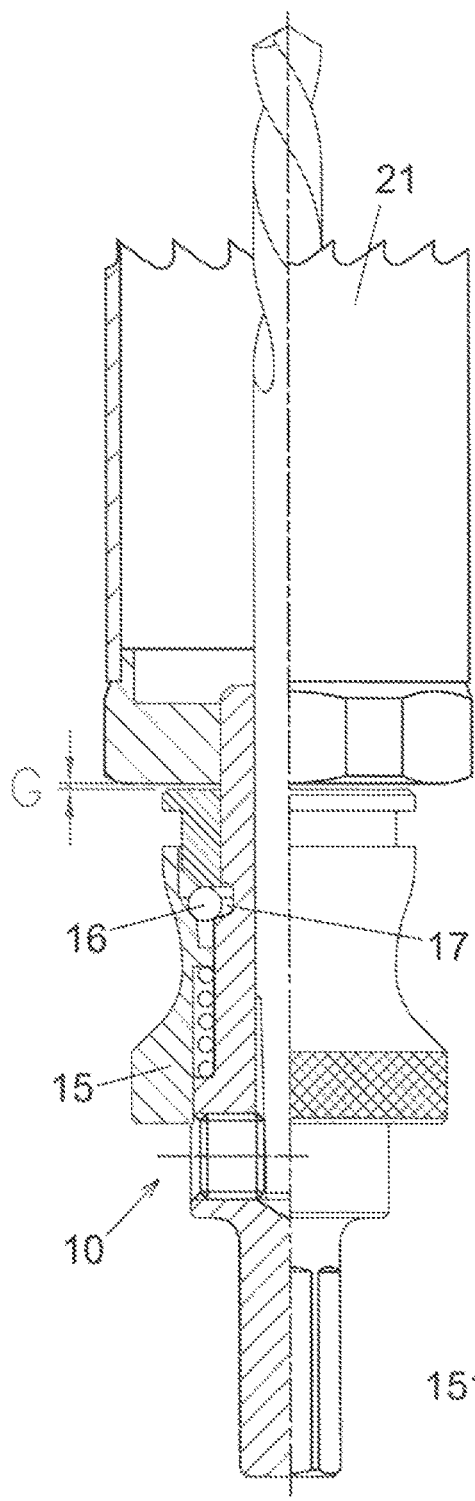
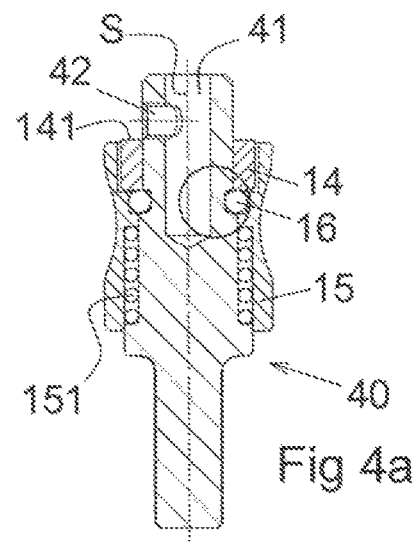
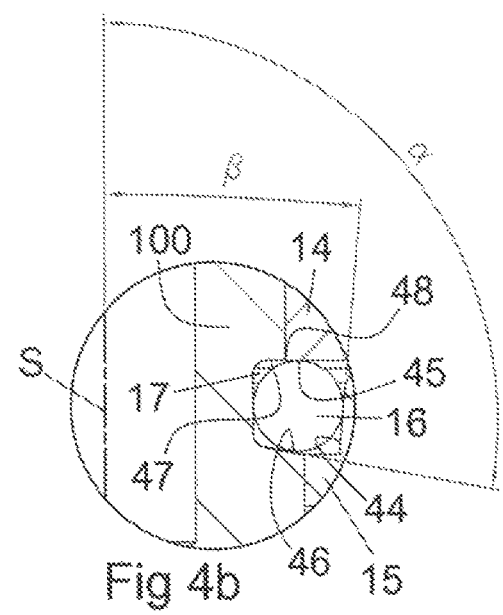
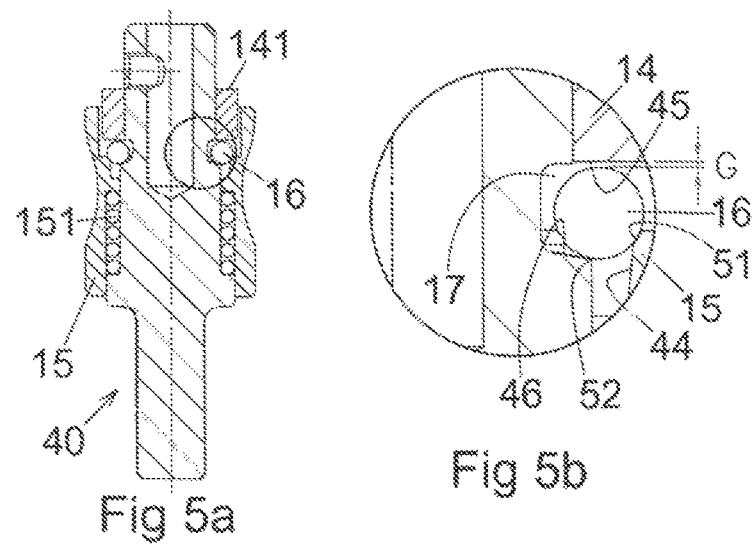
Fig 3
Fig 4a
Fig 4b
Fig 5a
Fig 5b

HOLDER FOR A ROTARY TOOL, FOR EXAMPLE ONE HOLE SAW

TECHNICAL FIELD

The present invention relates to the type of holder for rotary tools, for example hole saws, which are threaded onto an external holder thread arranged on a holding stud but without so-called drive pins.

BACKGROUND OF THE INVENTION

In the type of holder for hole saws where the holder is provided with an external thread on an axial holding stud, there is a problem upon replacement of hole saw by the fact that the use of the hole saw means that this is tightened hard in the thread and is then difficult to quickly replace by unscrewing it from the holding stud.

By U.S. Pat. No. 8,721,236, a holding device is previously known, which allows that a hole saw screwed onto a thread on a holder can be removed by displacing a friction means in the axial direction in relation to the holder to eliminate a preload of the thread. The position of the friction means of said holder device may be changed by means of an operating means, which is rotated in relation to the holder, which rotation gives rise to tangential motion of inner shoulders of the operating means. These shoulders press against balls situated in a gap between the friction means and the holder and are spring-biased by first spring means in the tangential direction. Furthermore, second spring means are connected to the holder to bias the balls in the radial direction. When the operating means is rotated, the balls are given a possibility of a radial movement by said second spring means, wherein the friction means may move in the direction from the hole saw and thereby eliminate the preload of the thread. The friction means is further, according to this known patent, rotationally fixed in relation to the holder.

This previously known holding device is complicated by it requiring two different types of springs, which act in different directions and one spring of which acts radially against the balls to press these outward when such a radial space is present. In addition, this construction is difficult to assemble because of its numerous components. Furthermore, there is greater risk of a complicated design that functional disorders will occur.

Such known designs are also bulky and require diameters that often are greater than the hole saw diameters, which implies that the holder will limit the possible depth of bore since the holder will be blocked by the workpiece.

THE OBJECT OF THE INVENTION

The object of the invention is to provide a holder for rotary tools, for example hole saws, which holder can be manufactured with a slimmer shape so that also small saw diameters can be drilled deeper into a workpiece than what is possible by existing holders.

The object is also to provide a holder in which the number of components has been reduced in relation to similar known holders, which means greater serviceability and simpler assembly.

In addition, the object is to increase the speediness in disassembly and replacement of a rotary tool, for example a hole saw, by the manoeuvre being carried out with a length displacement of an operating means either rectilinearly or by rotation.

SUMMARY OF THE INVENTION

By the present invention, as this appears in the independent claim, the above-mentioned objects are met, wherein said disadvantages have been eliminated. Suitable embodiments of the invention are defined in the dependent claims.

The invention concerns a holder for a rotary tool, for example a hole saw, which holder is formed with an essentially rotationally symmetrical holder body. The holder body comprises a rear drive end, which, for example, is adapted to be clamped in a chuck of a drilling machine, and a front connection end having a connection thread for the connection of the rotary tool. The holder comprises a thrust collar which is placed at the connection end and around the same and which has at least one contact surface facing the connection end of the holder. The contact surface has a shape connecting directly or indirectly to the assembled rotary tool. With an indirectly connecting shape, it is meant that an intermediate ring or a friction ring is placed between the thrust collar and the tool. Usually, the contact surface is flat but also conical friction surfaces are feasible within the scope of the invention. Also one or more contact surfaces which only connect to the thrust collar entirely, partly, or point-wise are comprised by the invention. The thrust collar is preferably rotatably placed around the holder body but may in other embodiment examples be unrotatably arranged in relation to the holder body but achieve the same function. The holder comprises further an axially movable operating means. Its axial motion is provided either by rectilinear motion or by a rotary motion. The holder comprises also a number of restraint elements placed in one or more spaces in the holder body. In embodiments having only one space, this is arranged as a circumferential groove in the holder body. In embodiments having several spaces, such a space may contain several restraint elements in each space, and then preferably the same number of restraint elements in each space. Also embodiments having one space for each restraint element are embraced by the invention. Each restraint element is prevented by the operating means from radial movement in said spaces in a first axial position of the operating means and each restraint element is free to make a radial movement in said spaces in a second axial position of the operating means. In addition, the restraint elements are allowed to be displaced upon said radial movement also a distance in the axial direction. Each one of said spaces for the restraint elements is limited in the axial direction by a front limiting wall as well as by a rear limiting wall, which two limiting walls constitute parts of the holder body.

In one embodiment of the invention, said spaces are formed as a common, circumferential groove in the holder body. This design is advantageous from a production point of view.

In one embodiment of the invention, a normal to the front limiting wall is parallel to the symmetry line of the holder body.

In one embodiment of the invention, at least the outermost part of the rear limiting wall forms the angle $\alpha$ with the symmetry line of the holder body wherein $100°<\alpha<115°$, preferably $\alpha=107°$. This leaning limiting wall allows that the restraint elements can move a bit axially when the operating means allows the restraint elements to move radially. The axial motion is sufficient to eliminate the stresses arisen in the threaded joint between the holder body and the connected tool.

In one alternative embodiment, the thrust collar is provided with an inner edge portion, which forms the angle $\delta$ with the symmetry line of the holder body wherein $100°<\delta<115°$, preferably $\delta=107°$. This angled edge portion provides a combination of a radial and an axial motion of the restraint elements, which axial motion is sufficient to eliminate the stresses arisen in the threaded joint between the holder body and the connected tool. As a complement to this alternative embodiment, a normal to the rear limiting wall may be parallel to the symmetry line of the holder body.

In one embodiment of the invention, the operating means is formed as a sleeve which is situated around the holder body and which in its two axial positions entirely surrounds the restraint elements and at least partly surrounds the thrust collar.

In one embodiment of the invention, the operating means abuts, in its first axial position, against the restraint elements with an inner conical surface, which forms the angle $\beta$ with the symmetry line of the holder body wherein $0°<\beta<10°$, preferably $\beta=5°$.

In one embodiment of the invention, the operating means allows, in its second axial position, the restraint elements to axially be moved rearward and radially outward in said spaces.

In one embodiment of the invention, the restraint elements are formed as spherical balls.

In one embodiment of the invention, the diameter of the balls is 1 mm to 7 mm, preferably 3 mm.

In one embodiment of the invention, the operating means is axially displaceable rearward against the action of a spring. The spring is usually formed as a screw spring, which surrounds the holder body and is placed in a turned recess in the holder body. Also the operating device is provided with a corresponding turned recess so that a spring housing is formed between the holder body and the operating device at their overlapping.

In one embodiment of the invention, the holder is provided with a central, cylindrical seat oriented in parallel to the symmetry axis of the holder and in which a radially directed locking thread is arranged, wherein a locking screw can be tightened in the locking thread and fix a centre bit placed in the seat.

In one embodiment of the invention, the contact surface is flat. This flat contact surface co-operates in this connection with a likewise flat surface of the rotary tool.

Primarily, the rotary tool concerns a hole saw, but also other rotary tools may be conceivable, for example milling cutters, grinding tools, reamers, etc.

BRIEF DESCRIPTION OF THE DRAWINGS

Now, the invention will be described in more detail, references being made in connection with the accompanying drawing figures.

FIG. 1 shows a holder according to a first embodiment of the invention in a partial section.

FIG. 2 shows a holder according to FIG. 1 with assembled tool according to the invention in a partial section.

FIG. 3 shows the holder according to FIG. 2 operated for the disassembly of the tool.

FIG. 4a shows a section through a second embodiment of a holder according to the invention.

FIG. 4b shows a partial enlargement according to the marking in FIG. 4a.

FIG. 5a shows the holder according to FIG. 4a in a position for disassembly.

FIG. 5b shows a partial enlargement according to the marking in FIG. 5a.

FIG. 6b shows a partial enlargement according to the marking in FIG. 6a.

FIG. 7b shows a partial enlargement according to the marking in FIG. 7a.

DESCRIPTION OF THE INVENTION

Figure 6A:
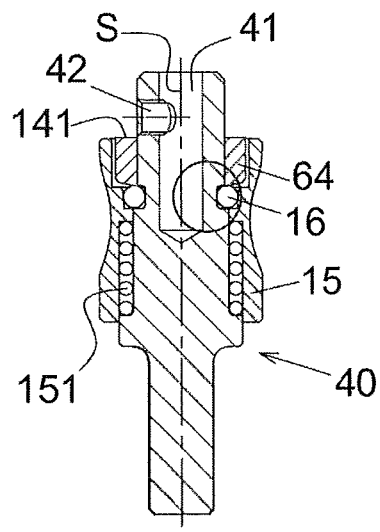
FIG. 6a shows a section through a third embodiment of a holder according to the invention.

FIG. 1 shows a holder 10 according to the invention which holder is provided with a connected centre bit CB. The holder 10 consists of a holder body 100 having a rear drive end 11 and a front connection end 12. The drive end 11 is formed as a hexagonal shaft for the fixing in a driving tool, for example in a chuck of a drilling machine. Also other embodiments of the drive end are naturally feasible. The connection end 12 is provided with a connection thread 13 to which a rotary tool 21, for example a hole saw, is screwed on. The holder 10 comprises at the connection end 12 and placed around the same a thrust collar 14 having a contact surface 141 facing the connection end 12 of the holder 10. In the embodiment example shown, the contact surface 141 is flat and directed so that a normal to the contact surface 141 is parallel to the symmetry axis S of the holder. The holder 10 comprises further an axially movable operating means 15, which is axially movable against the action of a spring 151, which in the figure is shown as a screw spring. This spring 151 surrounds the holder body 100. Furthermore, a number of restraint elements 16 are placed in one or more spaces 17 in the holder body 100 and which restraint elements 16 in a first axial position of the operating means 15, which position is shown in the figure, are prevented by the operating means 15 from radial movement in said spaces 17. As seen in the figure, the operating means 15 is formed as a sleeve which is situated around the holder body 100 and which entirely surrounds the restraint elements 16 and at least partly surrounds the thrust collar 14. The thrust collar 14 is provided with a surface-enlarging flange 142 having a diameter that corresponds to the diameter of the operating means 15 where the same overlaps the thrust collar 14. The centre bit CB is placed in a seat 18 which bottoms behind/under the operating means 15 and locked in the holder body 100 by a screw in a locking thread 19 directed perpendicular to the seat.

FIG. 2 shows the holder in FIG. 1 with a connected tool 21, for example a hole saw. The hole saw shown in the figure is provided with a hexagonal connection 22 to allow use of a key to assemble and disassemble the hole saw. As seen in the figure, the hole saw abuts with a flat lower surface against the corresponding flat contact surface 141 of the thrust collar. By the fact that the operating means 15 is situated in its upper position, each restraint element 16 is held in place in the respective space 17 without possibility of neither radial nor axial displacement in the space 17 in relation to the holder body 100. The operating means 15 is held in this upper axial position by the spring 151 acting on the operating means 15. In this upper position of the operating means 15, during operation of the hole saw, the same will be pulled toward the holder and significant stresses are obtained between co-operating threads. An elimination of these stresses has to be made by tools for loosening the hole saw from the holder if disassembly should be carried out in this position.

FIG. 3 shows the holder 10 with assembled tool 21, here a hole saw, with the operating means 15 of the holder in its lower axial position, wherein the restraint elements 16 can move radially and axially in the space 17 to the position shown in the figure. The axial motion of the restraint elements 16 creates a gap G between the flat lower surface of the hole saw and the corresponding flat contact surface 141 of the thrust collar. The size of the gap G is not greater than that the gap eliminates the thread stress in a specific embodiment between the thread of the hole saw and the connection thread and that then the hole saw easily can be unscrewed from the holder only by manual power. For example, 0.8 mm>G>0.2 mm.

FIG. 4a shows an axial section through a holder 40 according to a second embodiment of the invention. The holder is provided with a seat 41 for a centre bit, which is locked in the seat by a locking screw in a locking thread 42 perpendicular to the axial direction of the seat and the symmetry axis S of the holder. The seat according to this second embodiment bottoms in the area inside the operating means 15 and the locking thread is placed in front of/above the operating means 15. The holder 40 is provided with an operating means 15 in its upper axial position thereof, i.e., the locking position, when the operating means 15 by means of the spring 151 holds the restraint elements 16 in their inner positions. The figure shows an embodiment having a thrust collar 14 of a different design by the fact that the surface-enlarging flange is lacking, which gives the contact surface 141 thereof a smaller area.

FIG. 4b shows a magnification of the area around a restraint element 16 which, in the locking position, is situated innermost in the space 17 and retained in this position by an inner conical surface 44 of the operating means 15. The restraint elements 16 constitute in this position an axial locking for the thrust collar 14 by the inner edge portion 45 thereof abutting against the restraint elements 16 by an axial force, which is balanced by a counter-directed axial force by the restraint elements 16 being prevented from axial motion by a rear limiting wall 46 of the space 17 which axially is limited forward by a front limiting wall 47. Said rear limiting wall 46 or at least the outermost part of the rear limiting wall 46 forms the angle α with the symmetry line S of the holder body 100 wherein 100°<α<115°, and preferably α=107°. The figure also shows that the conical inner surface 44 of the operating means 15 forms the angle β with the symmetry line S of the holder body 100 wherein 0°<α<10°, and preferably α=5°.

FIG. 4b also shows the position of a biased restraint element 16 where this in the space 17 abuts partly against a corner 48 at the front limiting wall 47, partly against the inner edge portion 45 of the thrust collar, partly against the rear angled limiting wall 46, and partly against the inner conical surface 44 of the operating means. In this biased state, the tool, the thrust collar, the restraint elements, and the holder body have been pressed in place against each other.

FIG. 5a shows the holder 40 according to FIG. 4a with the operating means 15 displaced against the action of the spring 151 to its second axially lower position in which the restraint elements 16 in a limited way can move on one hand in the radial direction but also in the axial direction. By the fact that the restraint elements 16 move axially, the stress that has been built up between the flat lower surface of the hole saw and the corresponding flat contact surface 141 of the thrust collar will be eliminated and the hole saw can easily be unscrewed from the holder.

FIG. 5b shows a magnification of the area around a restraint element 16, which, by the fact that the operating means 15 has been displaced downward, allows the restraint element 16 to be displaced radially outward as well as axially rearward, i.e., downward in the figure, which means that an axial displacement rearward of the thrust collar 14 the distance G is possible. This displacement entirely eliminates the stress between said surfaces and the hole saw can easily be unscrewed from the holder. Upon the displacement of the operating means 15, the inner conical surface 44 will no longer abut against the restraint elements 16 but still an edge surface 51 of the operating means 15 will limit the radial and axial motion of the restraint elements 16, which is seen in the figure.

FIG. 5b also shows the position of an unbiased restraint element 16, which has been released by the operating means 15 having been brought rearward. The restraint element 16 has in this connection been displaced radially outward as well as axially rearward and abuts only against the edge surface 51 of the operating means 15, the rear angled limiting wall 46 of the space 17 or the corner 52 thereof, as well as against the inner edge portion 45 of the thrust collar 14. Alternatively, the restraint element has been displaced so that a gap G has been formed between the thrust collar 14 and the restraint element 16. In this unbiased state, the stresses between the tool, the thrust collar, the restraint elements, and the holder body have released and the tool can, without hindrance, be unscrewed from the connection end.

Thus, the holder 10 comprises a thrust collar 14 against which the tool, the hole saw, bottoms and locks under load. A number of restraint elements 16, e.g., balls, are located between the thrust collar 14 and a surface 46 on the holder body 100, which surface has an angle α to the principle axis. A sleeve which in its upper position locks the balls in a position closer to the principle axis and in a lower position allows the balls to be pressed outward, wherein the thrust collar 14 can move the distance G toward said rear drive end 11 of the holder body and thereby release the locking that is present between the underside of the hole saw and the thrust collar 14. The interior of the sleeve has a conical surface 44 with the angle β to the principle axis which in the upper position of the sleeve abuts against the balls and a greater inner diameter which in the second position of the sleeve gives room for the balls to move radially outward. The screw spring holding the sleeve in its upper position according to FIGS. 1, 2, 4 allows the user to by manual power pull the sleeve to its lower position according to FIGS. 3, 5a.

In the embodiments described hitherto, the space/spaces of the holder body for the restraint elements is/are formed with an angled rear limiting wall, which contributes to the restraint elements being displaced radially outward by the axial force mediated to the restraint elements by the thrust collar when the operating means allows such a radial movement.

FIGS. 6a-7b show a third embodiment of the invention, which embodiment differs from the embodiments described above in that the holder is provided with a thrust collar the abutment surface of which against the restraint elements forms an angle with the symmetry line of the holder with the same function as the previously shown angled rear limiting wall, i.e., to contribute to the restraint elements being displaced radially outward by the axial force mediated to the restraint elements by the thrust collar when the operating means allows such a radial movement.

In the following, the same reference designations are used for corresponding details of previously shown embodiments.

FIG. 6a shows an axial section through a holder 40 according to a third embodiment of the invention. The holder is provided with a seat 41 for a centre bit, which is locked in the seat by a locking screw in a locking thread 42 perpendicular to the axial direction of the seat and the symmetry axis S of the holder. The seat according to this second embodiment bottoms in the area inside the operating means 15 and the locking thread is placed in front of/above the operating means 15. The holder 40 is provided with an operating means 15 in its upper axial position thereof, i.e., the locking position, when the operating means 15 by means of the spring 151 holds the restraint elements 16 in their inner positions. The figure shows an embodiment having a thrust collar 64 of a different design on one hand by the surface-enlarging flange according to FIGS. 1-3 lacking, which gives the contact surface 141 thereof a smaller area and, on the other hand by the abutment surface of the thrust collar against the restraint elements 16 being angled.

Figure 6B:
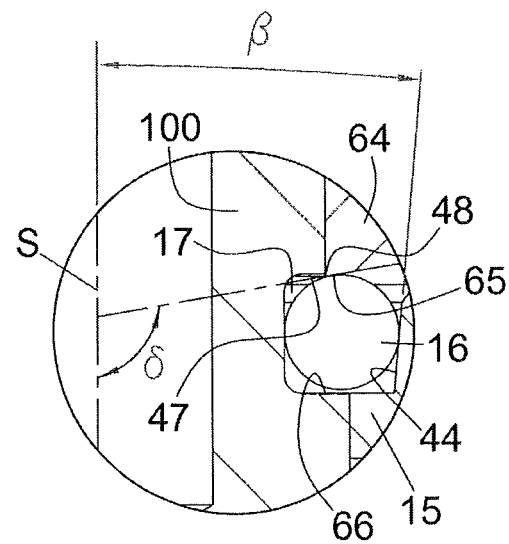

FIG. 6b shows in enlargement the area around a restraint element 16 according to the marking in FIG. 6a. The restraint element 16 shown in the locking position is situated innermost in the space 17 and is retained in this position by the inner conical surface 44 of the operating means 15. The restraint elements 16 constitute in this position an axial locking for the thrust collar 64 by the inner edge portion 65 thereof abutting against the restraint elements 16 by an axial force, which is balanced by a counter-directed axial force by the restraint elements 16 being prevented from axial motion by a rear limiting wall 66 of the space 17 which axially is limited forward by a front limiting wall 47. Said rear limiting wall 66 or at least the outermost part of the rear limiting wall 46 forms a right angle with the symmetry line S of the holder body 100. Also the front limiting wall 47 forms a right angle with the symmetry line S of the holder body 100. In this embodiment, the thrust collar 64 is provided with a lower surface 65, which abuts against the restraint elements 16, which surface forms the angle δ with the symmetry line S of the holder body 100 wherein $100°<δ<115°$, and preferably $δ±107°$. As previously shown, the conical inner surface 44 of the operating means 15 forms the angle β with the symmetry line S of the holder body 100 wherein $0°<β<10°$, and preferably $β=5°$. The figure shows the situation when a biased restraint element 16 abuts in the space 17 and partly against the inner edge portion 65 of the thrust collar 64, and partly against the rear perpendicular limiting wall 66, and partly against the inner conical surface 44 of the operating means 15. In this biased state, the tool, the thrust collar, the restraint elements, and the holder body have been pressed in place against each other.

Figure 7A:
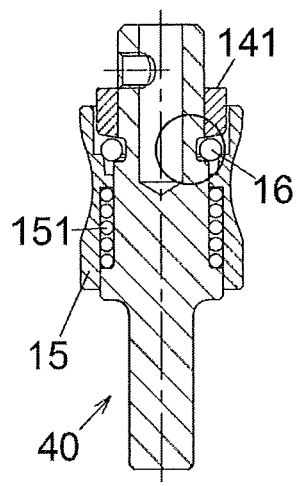
FIG. 7a shows the holder according to FIG. 6a in a position for disassembly.

FIG. 7a shows the holder 40 according to FIG. 6a with the operating means 15 displaced against the action of the spring 151 to its second axially lower position in which the restraint elements 16 in a limited way can move on one hand in the radial direction but also in the axial direction. By the fact that the restraint elements 16 move axially, the stress that has been built up between the flat lower surface of the hole saw and the corresponding flat contact surface 141 of the thrust collar will be eliminated and the hole saw can easily be unscrewed from the holder.

Figure 7B:
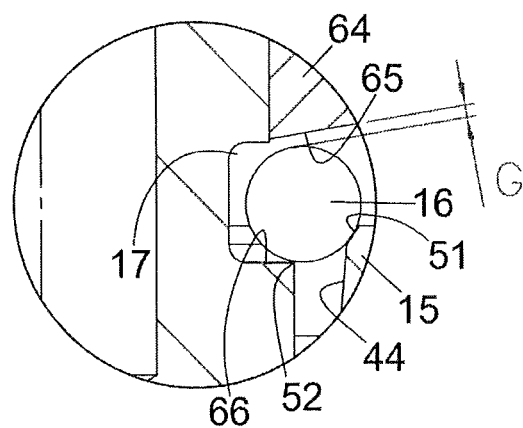

FIG. 7b shows a magnification of the area around a restraint element 16, which, by the fact that the operating means 15 has been displaced axially downward/rearward, allows the restraint element 16 to be displaced radially outward as well as axially rearward, i.e., downward in the figure, which means that an axial displacement rearward of the thrust collar 64 the distance G is possible. This displacement entirely eliminates the stress between said surfaces and the hole saw can easily be unscrewed from the holder. Upon the displacement of the operating means 15, the inner conical surface 44 will no longer abut against the restraint elements 16 but still an edge surface 51 of the operating means 15 will limit the radial and axial motion of the restraint elements 16, which is seen in the figure.

FIG. 7b also shows the position of an unbiased restraint element 16, which has been released by the operating means 15 having been brought rearward. The restraint element 16 has in this connection been displaced radially outward as well as axially rearward by the angled inner edge portion 65 of the thrust collar 64 and abuts only against the edge surface 51 of the operating means 15, the corner 52 of the rear limiting wall 66 of the space 17, as well as against the inner edge portion 65 of the thrust collar 64. Alternatively, the restraint element has been displaced so that a gap G has been formed between the thrust collar 64 and the restraint element 16. In this unbiased state, the stresses between the tool, the thrust collar, the restraint elements, and the holder body have released and the tool can, without hindrance, be unscrewed from the connection end.

The invention claimed is:

1. Holder for a rotary tool, whereby the rotary tool is one of a hole saw, a milling cutter, a grinding tool or a reamer, which holder is formed with a rotationally symmetrical holder body comprising a rear drive end, and a front connection end having a connection thread for the connection of the rotary tool using a corresponding connection thread on the rotary tool, that the holder comprises an axially movable thrust collar which is placed at the connection end and around the connection end and which thrust collar has a contact surface facing the connection end of the holder and that the contact surface abuts against the assembled rotary tool, that the holder furthermore comprises an axially movable operating sleeve assembled around the holder body and a number of restraint elements placed in one or more spaces in the holder body and which restraint elements in a first axial position of the operating sleeve are prevented by the operating sleeve from radial movement in said spaces and which restraint elements in a second axial position of the operating sleeve are free to make a radial movement in said spaces, wherein the restraint elements upon said radial movement also are displaced a distance in the axial direction so that a gap between the contact surface and an assembled rotary tool is created in order to reduce the stress obtained between the connection thread and the corresponding connection thread and that each one of said spaces for the restraint elements is limited in the axial direction by a front limiting wall as well as by a rear limiting wall, which two limiting walls constitute parts of the holder body.

2. Holder according to claim 1, wherein said spaces are formed as a common, circumferential groove in the holder body.

3. Holder according to claim 1, wherein a normal to the front limiting wall is parallel to the symmetry line of the holder body.

4. Holder according to claim 1, wherein at least the outermost part of the rear limiting wall forms the angle α with the symmetry line of the holder body wherein $100°<α<115°$.

5. Holder according to claim 4, wherein $α=107°$.

6. Holder according to claim 1, wherein the thrust collar is provided with an inner edge portion, which forms the angle δ with the symmetry line of the holder body wherein $100°<δ<115°$.

7. Holder according to claim 6, wherein $δ=107°$.

8. Holder according to claim 6, wherein a normal to the rear limiting wall is parallel to the symmetry line of the holder body.

9. Holder according to claim 1, wherein the operating sleeve is situated around the holder body and in its two axial positions entirely surrounds the restraint elements and at least partly surrounds the thrust collar.

10. Holder according to claim 1, wherein the operating sleeve in its first axial position abuts against the restraint elements with an inner conical surface, which forms the angle β with the symmetry line of the holder body wherein 0°<β<10°.

11. Holder according to claim 10, wherein β=5°.

12. Holder according to claim 1, wherein the operating sleeve in its second axial position allows the restraint elements to axially be moved rearward and radially outward in said spaces.

13. Holder according to claim 1, wherein the restraint elements are formed as spherical balls.

14. Holder according to claim 13, wherein the diameter of the balls is 1 mm to 7 mm.

15. Holder according to claim 13, wherein the diameter of the balls is 3 mm.

16. Holder according to claim 1, wherein the operating sleeve is axially displaceable rearward against the action of a spring.

17. Holder according to claim 1, wherein the holder is provided with a central, cylindrical seat in which a radially directed locking thread is arranged, wherein a locking screw can be tightened in the locking thread and fix a centre bit placed in the seat.

18. Holder according to claim 1, wherein the contact surface is flat.

19. Holder according to claim 1, wherein the rear drive end is adapted to be clamped in a chuck of a drilling machine.

\* \* \* \* \*